Figure 12:
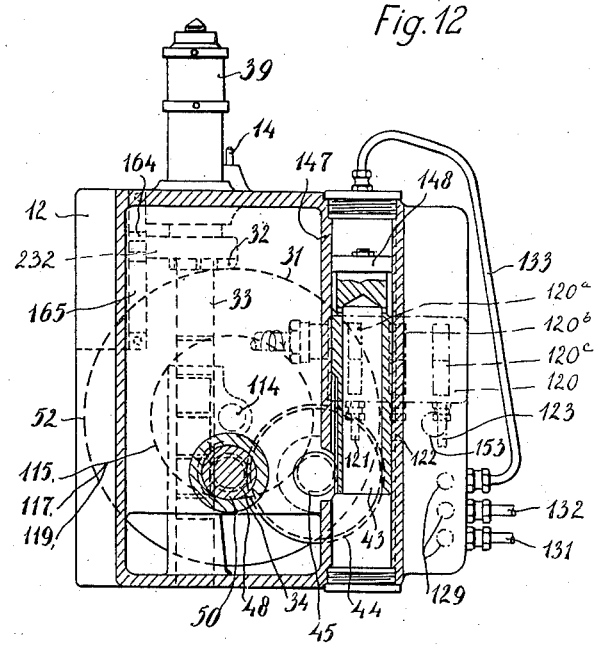

July 13, 1937.                F. KOPP                2,086,915
                            MACHINE TOOL
                        Filed Nov. 9, 1934        7 Sheets-Sheet 1
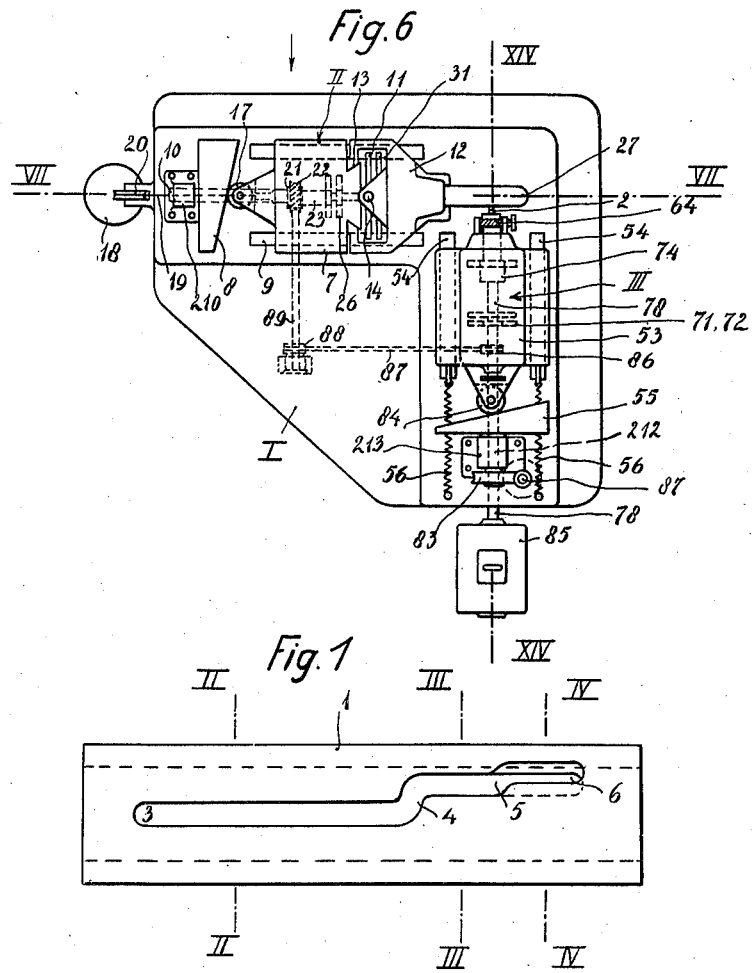
Inventor:
Fritz Kopp
by Karl Michaelis
   atty.

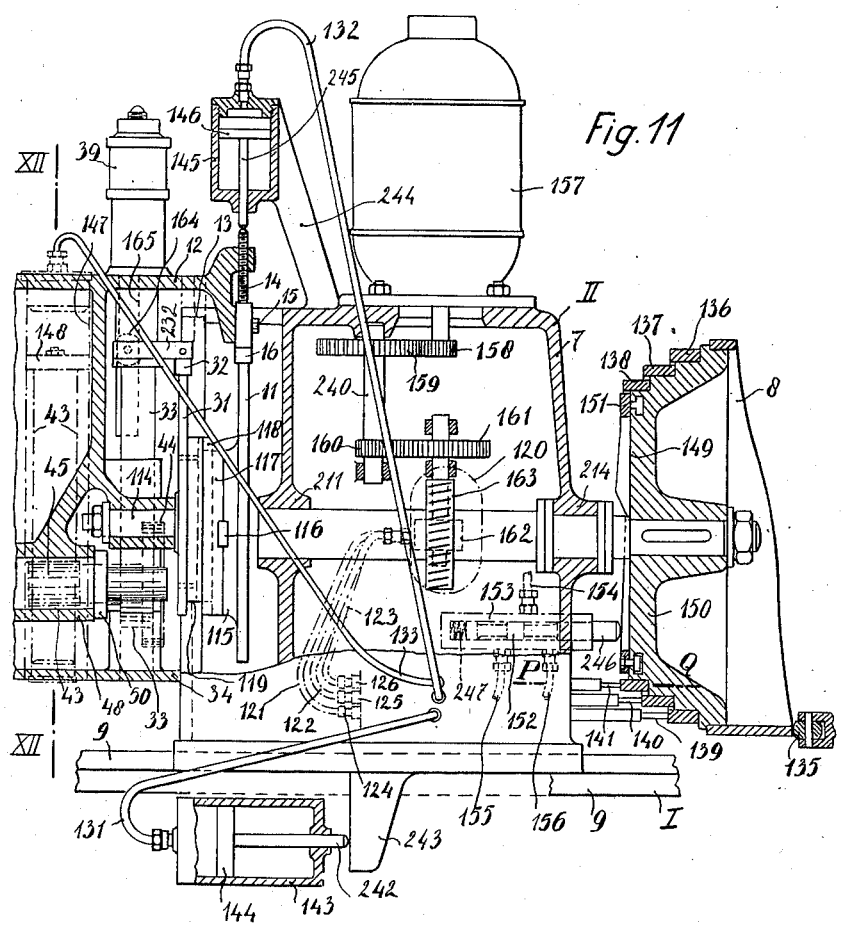

July 13, 1937.   F. KOPP   2,086,915
MACHINE TOOL
Filed Nov. 9, 1934   7 Sheets-Sheet 3
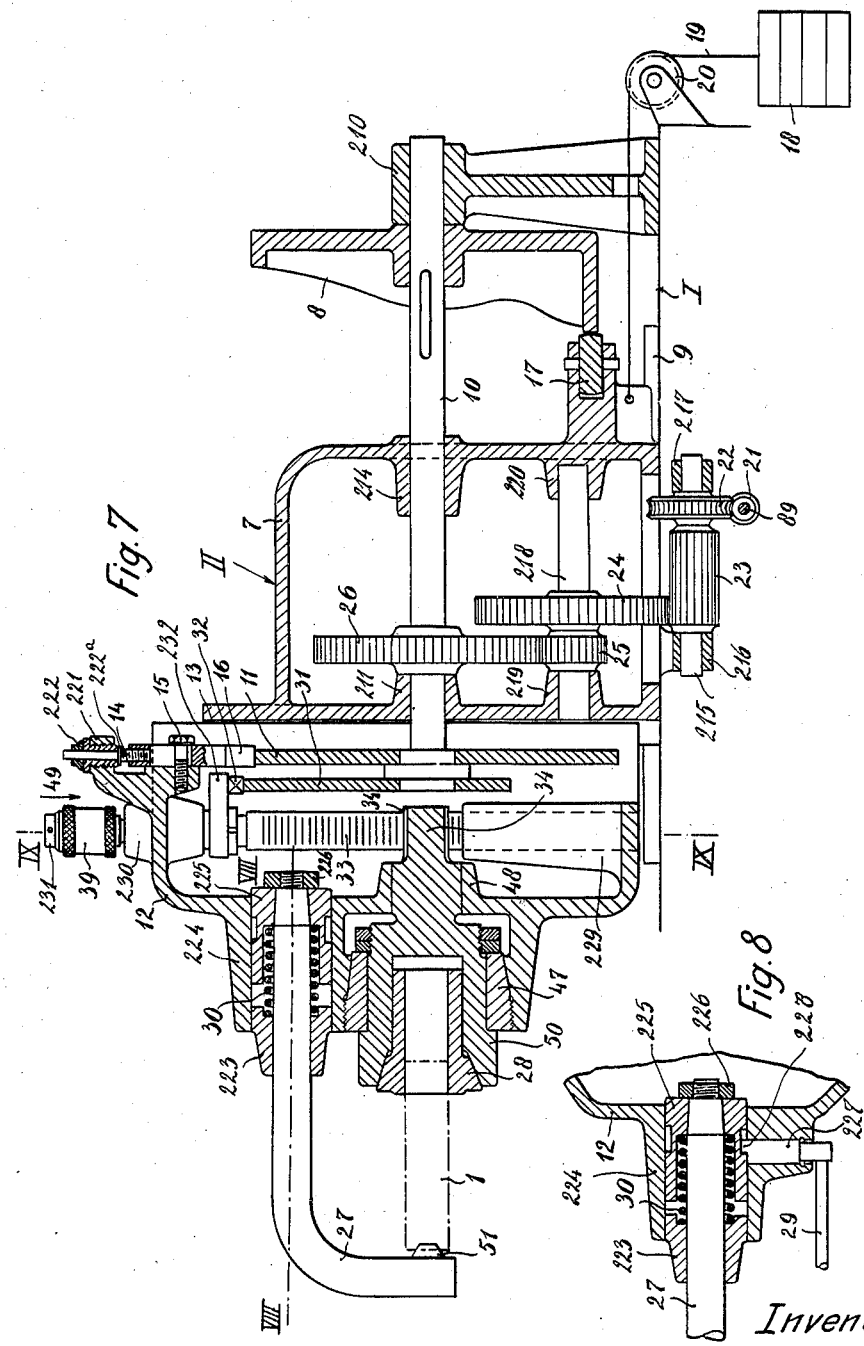
Inventor:
Fritz Kopp
by Karl Michaelis
atty.

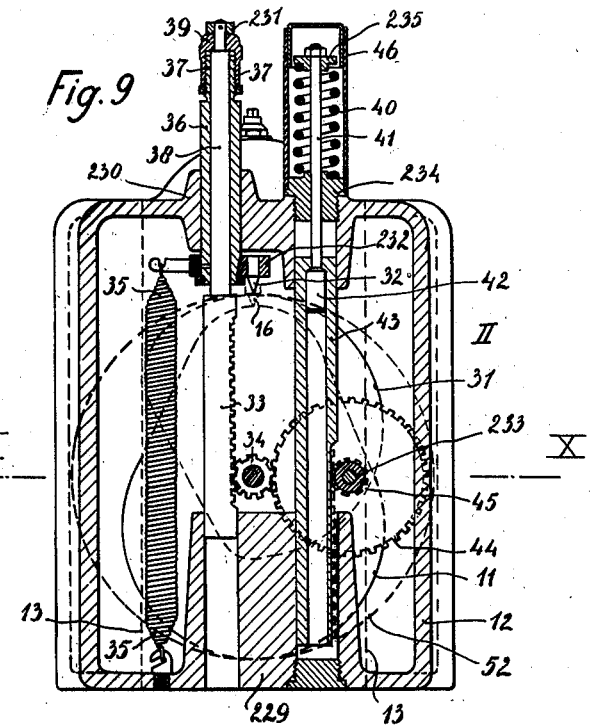
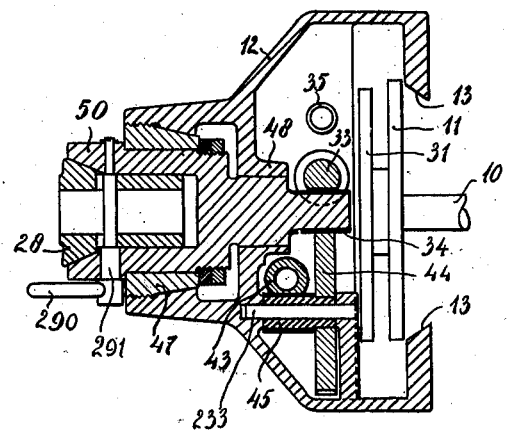

July 13, 1937.　　　　　F. KOPP　　　　　2,086,915
MACHINE TOOL
Filed Nov. 9, 1934　　　7 Sheets-Sheet 5

Inventor:
Fritz Kopp
by Karl Michaelis
Atty.

July 13, 1937.  F. KOPP  2,086,915
MACHINE TOOL
Filed Nov. 9, 1934   7 Sheets-Sheet 6
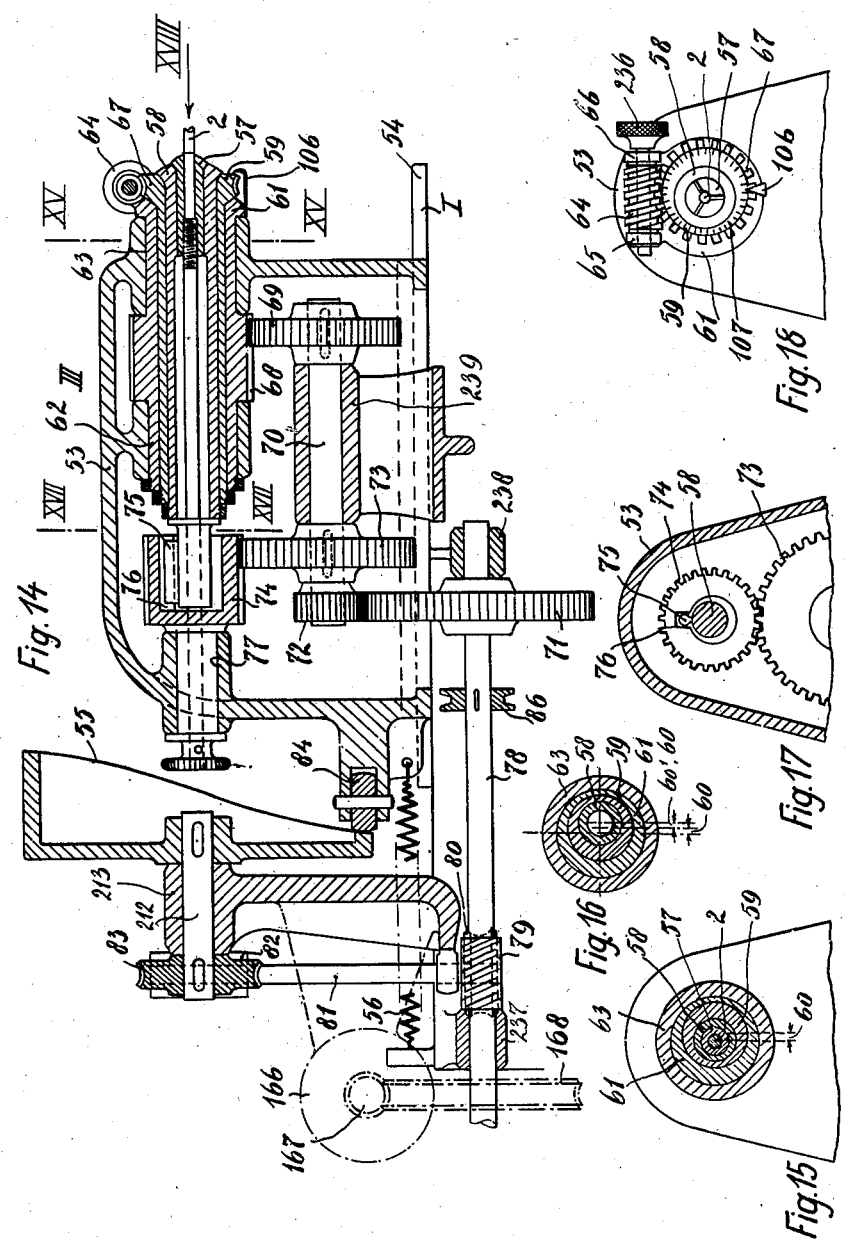
Inventor:
Fritz Kopp
by Karl Michaelis
Atty.

July 13, 1937.  F. KOPP  2,086,915
MACHINE TOOL
Filed Nov. 9, 1934  7 Sheets-Sheet 7
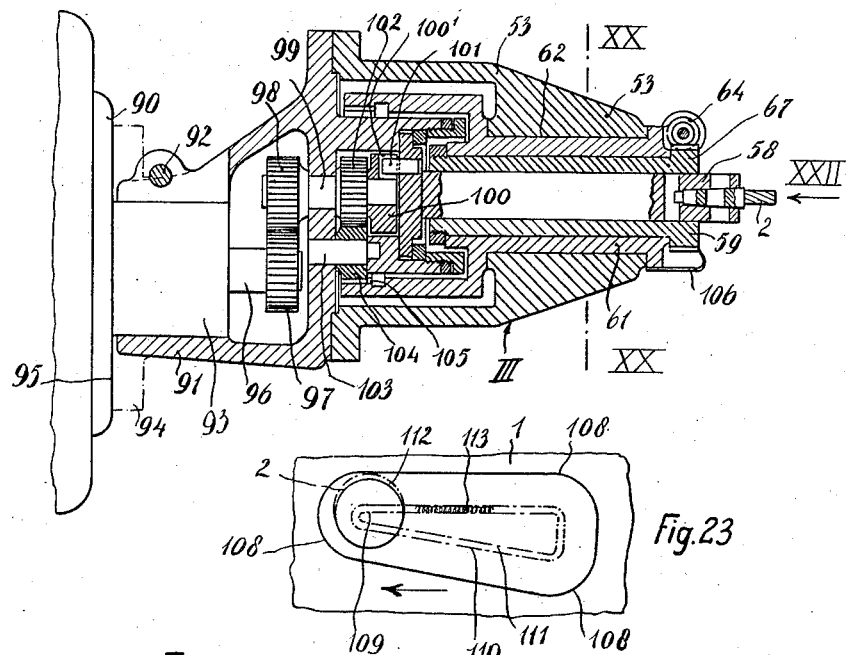
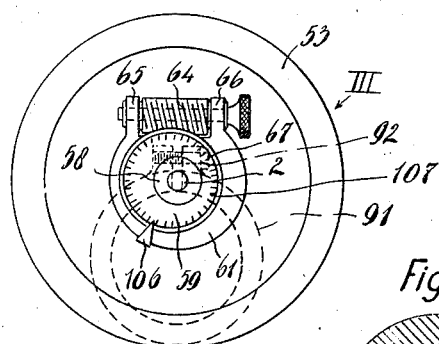
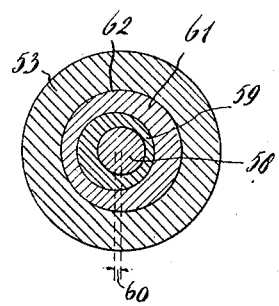
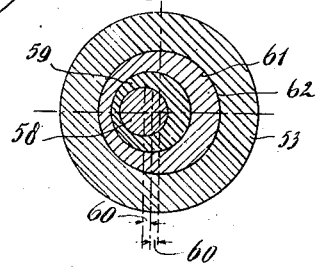
Inventor:
Fritz Kopp
by Karl Michaelis
Atty.

Patented July 13, 1937

2,086,915

UNITED STATES PATENT OFFICE 2,086,915

MACHINE TOOL

Fritz Kopp, Ulm-on-the-Donau, Germany

Application November 9, 1934, Serial No. 752,308
In Germany December 15, 1932

38 Claims. (Cl. 90—13)

My invention relates to machine tools. It is an object of my invention to provide a machine tool for the generation of curved or straight faces or slots in work pieces or blanks which faces may be in a plane or may constitute curves in space, so as to obtain a much greater variety of forms in the generated faces or curves, and much better work, than in the existing means for the same purpose.

To this end, I provide, in a machine tool, rotary means for holding a work piece or blank, and means for holding a tool, in combination with mechanism including camming members shaped in conformity with the operations to be performed on the work piece. The camming members impart relative movement to the rotary means for holding the work piece, and to the means for holding the tool, being for instance formed as rotary camways for shifting the carriages, on which the respective holding means are mounted, in parallel to the axis of the respective holding means; they shift the rotary means transversely to its own axis, and they impart to the rotary means rotation about its own axis. The rotation may extend through any desired angle including a complete revolution of the work-piece holding means, or several complete revolutions.

By way of example, my novel machine tool will be described as equipped with a milling cutter, but it is understood that I may use any other tools, such as lathe cutters, grinding wheels, etc., for generating the faces referred to.

The improvement achieved by my invention relates to the general configuration of the generated faces or curves as well as to the dependency of their form of the dimensions of the tool.

Referring first to the general configuration of the faces, it is old to provide templates for the work piece by which it is displaced in one or two directions with respect to the axis of the tool. It is also old to generate closed curves on a work piece by rotary tools but the rotation of such work-pieces is uniform and is produced, for instance, by worm and worm gear acting on the chuck in which the work piece is held.

My invention is distinguished from this in that the work piece, or its chuck, is rotated or oscillated through any desired angle, including the complete revolution of 360°, or several such revolutions, or is reversed by a camplate of any form within the possibilities of such camplates, so that the work piece is rotated or oscillated at any desired uniform or irregular velocity. By these means, those faces of the work piece whose configuration is determined by an oscillation or rotation of the work piece, can be generated freely, i. e., independently of uniform rotation of the work piece. At the same time, the rotary movement of the work piece may be so related to the other velocities of displacement, that the tool is fed along the faces to be generated at absolutely, or practically, uniform feed of the tool along the faces to be tooled, notwithstanding variations in the gradients of the curves.

Oscillation and rotation of the work piece, or of its chuck, may be effected by any suitable means. In a preferred embodiment of my invention, I provide a pinion on the chuck, a rack meshing with the pinion, and a cam-plate for reciprocating the rack. By these means, the chuck is rotated or oscillated about its own axis in conformity with the uniform or irregular movement imparted to the pinion by the rack.

The rack may be equipped with a pull-back spring, or with other means such as weights for returning it toward its initial position after it has been shifted by the camplate. Means may also be provided which make up for slack between the rack and the pinion, and such means may include another rack and pinion mechanism. If a spring is provided as part of the make-up means, it is desirable that the spring should be short and therefore a reduction gear is preferably inserted between the spring and the pinion.

The camplate by which the rotatory or oscillatory movement of the work-piece chuck about its axis is effected, may be keyed on the same shaft with other controls, such as a camway for reciprocating the work piece carriage in horizontal direction and a second camplate for reciprocating the work-piece support which is mounted to slide on the body of the carriage, in vertical direction. Or the camplate for imparting the rotatory or oscillatory movement may be keyed on one, the second camplate and the camway on another shaft, and the two shafts may be operatively connected by means such as an Oldham joint. If the two camplates are keyed on the same shaft, it is obviously necessary that those portions of the first camplate (i. e. the camplate for rotating or oscillating the chuck) which do not operate the chuck, should be parallel to those portions of the second camplate which operate at the same time as the inactive portions of the first camplate. The inactive portions of the first camplate should be arcs of a circle about the axis of the shaft, but this conflicts with the condition that they should be parallel to the corresponding portions of the second camplate which, as a rule, are not such arcs. On the other hand, if the first camplate is keyed on one shaft, and the second camplate is keyed on the other shaft, the first camplate can be made with concentric portions as required, independently of the second camplate.

The mechanism according to my invention may also be equipped with means for shifting the work-piece chuck in two directions, i. e. axially and transversely, in addition to the rotating and oscillating movement imparted to it. Such shifting means may also be operated by camplates or camways of any desired irregular configuration. Means may also be provided for the linear displacement of the work piece in still another direction. The work-piece chuck may be displaced with respect to the tool, or the tool, or its headstock, may be displaced with respect to the work-piece. In the last mentioned case, i. e. in the case of linear displacement in three distinct directions, linear displacement of the work piece and the tool is effected in the direction of the axis of the tool and transversely to its axis in two directions, and rotation or oscillation of the work piece is also performed. The four movements may each be performed at velocities which are varied as desired.

With my novel mechanism, slots or grooves of any configuration, including slots or grooves which are widened, i. e., slots or grooves whose width is greater than the diameter of the tool, say a milling cutter, all over or locally, and at any inclination of their sides to the face of the work piece, are made in flat work pieces or in work pieces which are of circular or other than circular cross-section. The teeth of gear wheels of any kind may also be generated by my novel mechanism, by milling and/or grinding.

Whatever may be the face to be tooled, my mechanism, with its three independent feed movements, improves the finish of the face as the velocity at which the work piece moves with respect to the tool, may be made absolutely or practically uniform by suitably selecting the curvatures of the camplates and camways. For instance, assume that a face has been generated which extends in parallel to the axis of the work piece, which operation is performed exclusively by a camway reciprocating the work-piece carriage; and that now it is desired to generate a face at an angle to the axis of the work piece. The movement of the work piece is now controlled by the camway and a camplate and the gradient of both elements may be made so small that the same, or practically the same, feed velocity is obtained for the inclined as well as for the parallel portion of the face. This is impracticable if lead screws or eccentrics are used, even for one of the components of the movement only.

A further improvement of the work is achieved by providing means for regulating the pressure between the camways, camplates, etc., and the lugs or the like which they engage for operating certain parts. The pressure may be regulated, for instance, by loading the lugs or the like by liquid under pressure, compressed air or other gas, or by weights mounted to be displaced on levers, or the like. The pressure at every camway or camplate must rise when the edge of the camway or camplate descends, and fall when the edge rises. This eliminates any chattering, and the power demand is also reduced.

Pressure exerting means of the kind referred to are old for shifting work-piece carriages, but the combination of such means with the other features of the invention is novel.

The pressures at all points of operative connection between a camway or camplate, and the mating part, may be regulated from a single movable part, for instance, from the shaft on which the camway for reciprocating the work-piece carriage is keyed, or from a disk on which the camway is secured. Pressure may be produced by a pump or a storage device, and may be regulated by means such as overflow valves.

The work-piece carriage may be mounted for displacement on slideways arranged above the slideways in which it is guided transversely to the axis of the tool, or the last-mentioned slideways, with the carriage, may be mounted on the first-mentioned slideways in the direction of the tool axis; or the head stock in which the tool is supported may be adapted to be shifted toward the work piece in the direction of the tool axis, independently of the periodical feeding, i. e., the adjustment of the tool, with the object of generating faces of various depths. Such displacement of the head stock may be effected by a camway, for instance, on the bed plate of the machine with which the work-piece carriage cooperates by its longitudinal movement transversely to the tool, or to which is imparted a movement of its own, for instance, from the support of the elevating cam. On the other hand, the work-piece carriage or the head stock may be provided with a camway by which during the movement of the work-piece carriage transversely to the head stock, the work-piece carriage and the tool are displaced with respect to each other in the direction of the tool axis, or a movable camway may be provided on the bed plate for shifting the head stock in the direction of the axis of the tool, which movable camway is operated in dependence of the movement of the work-piece carriage. Linear displacement of the work-piece carriage with respect to the tool in three directions at right angles to each other is novel per se, i. e., without the rotary or oscillating movement of the work piece as well as without the movement of the shifting means at independent velocity.

The mechanism according to my invention may be equipped with a motor, or other driving means, of its own so that it can be fitted to an existing machine, for instance, to a lathe, a milling machine, a grinding machine, or the like, for cooperation with the tool.

In order to tool, without alteration of the camways and camplates, various parallel faces with tools of the same diameter, or in order to make up for variations in the diameter of the tool by wear and regrinding, while conserving the form and position of the faces tooled: the tool spindle may be supported eccentrically in an auxiliary spindle which in turn is supported eccentrically in a principal driven spindle, or hollow shaft. Preferably, the two eccentricities are equal. By varying the position of the auxiliary spindle in the principal spindle, the total eccentricity of the tool may be varied from zero to twice the individual eccentricities, if the eccentricities are equal. The eccentricity is varied in a novel and particularly simple manner by a worm on the principal spindle and a worm gear on the auxiliary spindle.

By these means, and in combination with a relative movement of the tool and the work piece, a cycloidal movement of the tool is effected with respect to the face to be tooled and the height of the cycloid along the face to be tooled (the distance of its zeniths) is very small. At the same time, the tooled faces are adapted to variations in the tool diameter.

My invention also relates to the driving mechanism for the tool spindle whose axis travels on a cylindrical surface, from a driving shaft or member whose axis is fixed to a design of the head stock which enables it to be fitted to existing machines, such as milling machines, drill presses, lathes, etc.; and to the adjustment of the tool with respect to the work piece.

In the drawings affixed to this specification and forming part thereof, samples of the work performed with my novel mechanism, the mechanism itself, and various details thereof, are illustrated diagrammatically by way of example.

In the drawings

Figure 13:
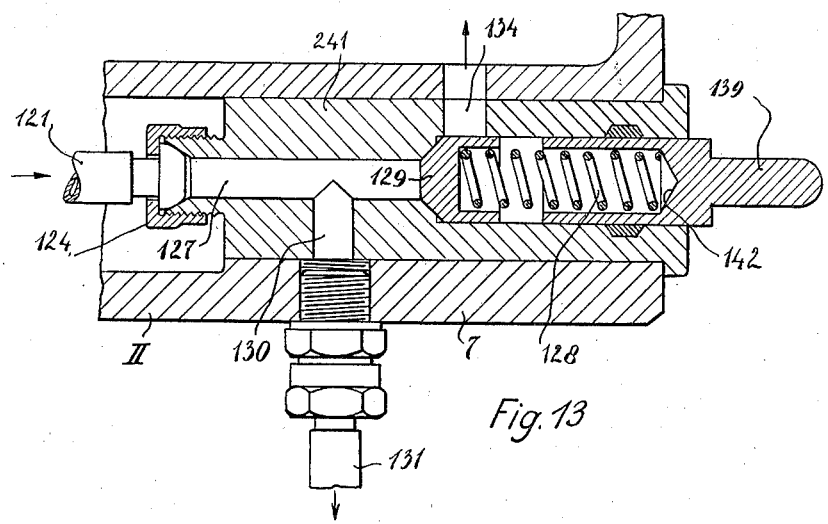

Fig. 1 is an elevation of a tubular work piece with a stepped slot of equal width therein, Figs. 2, 3, and 4 are sections on the corresponding lines in Fig. 1, Fig. 5 is a perspective illustration of a tubular work piece with an irregular slot of varying width therein, Fig. 6 is a plan view of the complete mechanism, showing the bed plate, the work-piece carriage, and the headstock, Fig. 7 is a section of the work-piece carriage, on the line VII—VII in Fig. 6, and as viewed in the direction of the arrow at the top of Fig. 6, drawn to a larger scale, Figs. 8 and 9 are sections on the corresponding lines in Fig. 7, Fig. 10 is a section on the line X—X in Fig. 9, Fig. 11 is a partly sectional elevation of a modified work-piece carriage, Fig. 12 is a section on the line XII—XII in Fig. 11, Fig. 13 is a detail of the carriage, drawn to a larger scale, Fig. 14 is a section of the head stock, on the line XIV—XIV in Fig. 6, drawn to a larger scale, Figs. 15 and 16 are sections on the line XV—XV in Fig. 14, Fig. 17 is a section on the line XVII—XVII in Fig. 14, Fig. 18 is an end elevation of the upper portion of the head stock, viewed in the direction of arrow XVIII in Fig. 14, Fig. 19 is an axial section of a head stock adapted to be fitted to an existing machine, Figs. 20 and 21 are sections on the line XX—XX in Fig. 19, Fig. 22 is an end elevation of the upper portion of the head stock viewed in the direction of arrow XXII in Fig. 19, and Fig. 23 shows a third sample of the work performed by the mechanism.

Referring now to the drawings, and first to Figs. 1 to 4, the tubular work piece or blank is tooled by a mechanism including a work-piece carriage II, Fig. 6, with a camway 8 for shifting the carriage along slideways 9 in a bed plate I, a camplate II for raising and lowering the work piece, a camplate 31 for rotating and oscillating the work piece, a head stock III, and a camway 55 for shifting the head stock in slide-ways 54 at right angles to the slideways 9 for the work-piece carriage II. All these parts will be described in full detail below. The tool is here shown as a milling cutter 2 by way of example but, as mentioned, I am not limited to any particular kind of tool.

It is intended to form a slot 3, 4, 5, 6 in the blank I by a milling cutter or other tool, or to grind the faces of the slot by a grinding wheel, not shown. The first reach 3—4 of the slot is parallel to the axis and its sides extend in parallel relation to the radius of the tubular blank, as shown in Fig. 1, the second reach 4—5 is parallel to, but stepped from, the reach 3—4, and its sides are parallel to those of reach 3—4, and consequently not radial. The last reach 5—6 is again parallel to, but stepped from the reach 4—5, and its sides may extend substantially in parallel relation to the radius of the blank, as shown in Fig. 4, or in any other desired direction with respect to the radius. It will appear that the position of the axis of the work piece I with respect to the axis of the tool 2 is different for each one of the three reaches. To change from the reach 3—4 to the reach 4—5, all that is required, is a straight-line displacement of the work piece, or its chuck, with respect to the carriage I, and this is effected by camplate II. However, to change from 4—5 to 5—6, not only camplate II must be operated but also camplate 31 as the work piece must be turned about its axis as well as displaced.

The slot illustrated in Figs. 1 to 4 is obviously only diagrammatic, and is shown by way of example only. The reaches might be curved and/or arranged at various angles to the axis of the work piece I instead of being parallel. They might also be rebent partly or throughout, in particular if the slot is replaced by a groove in the wall of the work piece. The object of the illustration in Figs. 1 to 4 is to show that it may be necessary to impart to a work piece two shifting movements at right angles to each other through camway 8 and camplate II, and rotary movement at non-uniform velocity, as at uniform velocity of rotation the parallel reaches could not be obtained. When beginning on the last reach 5—6, the work piece must obviously be rotated from the position Fig. 4 in such manner that the faces to be tooled are again parallel to the position in Fig. 3, i. e., extend in parallel to the axis of the milling cutter, if such a cutter is used.

A more complicated slot is illustrated in Fig. 5.

As mentioned, the sides of gear teeth, for spur gears as well as bevel and helical gears, can be generated and/or ground by my mechanism.

Referring now to Fig. 6, the machine comprises a bed plate I, a work-piece carriage II and a movable head stock III. The work-piece carriage II is mounted to slide on guide gibs 9 forming slide ways at opposite sides of an opening in the bed plate I, and the head stock III is similarly mounted on guide gibs 54 extending at right angles to the gibs 9. The work-piece carriage is subdivided into a carriage body 7 and a work-piece support 12 which is mounted to slide on the front end of the body 7 by means of a dove-tailed guide 13. At its rear end, the body 7 is equipped with a roller 17 which bears against the edge of a cylindrical camway 8. The camway is keyed on a shaft 10 whose rear end is mounted in a bearing 210 on the base plate I and the roller 17 is held engaged with the edge of camway 8 by a weight 18 through the medium of a cable 19 which runs on a sheave 20 and whose front end is secured to the body 7. One end of the work piece is held by an over-arm 27 on the support 12.

The head stock III is equipped with a roller 84 at its rear end which bears against the edge of a second cylindrical camway 55 on a shaft 212 in a bearing 213 on the bed plate I, under the pull of spring 56, and moves on slide ways 54.

The machine is driven by a motor 85 through mechanism which will be described in detail below.

Referring now to Figs. 7, 8, 9, and 10 which show the work-piece carriage drawn to a larger scale than in Fig. 6, it will appear that the spindle 10 whose rear end is mounted to rotate and to slide in the bearing 210, is mounted to rotate in a bearing 211 at the front, and in a bearing 214 at the rear of the hollow carriage body 7. Rotation is imparted to the shaft 10 from a shaft 89 operatively connected to the motor 85, (as will be described) through a worm 21 on shaft 89, a worm wheel 22 on a shaft 215 in bearings 216 and 217 extending downwardly from the bed plate I, an elongated pinion 23 on the shaft 215, a spur gear 24 and a pinion 25 on a lay shaft 218 in bearings 219 and 220 of the body 7, and a spur gear 26 on the shaft 10 which meshes with pinion 25.

As the shaft 10 rotates, the body 7 is reciprocated on the gibs 9 by the cooperation of camway 8 and weight 18. Obviously, any other member, such as a drum or a camplate, not shown, might be provided instead of camway 8. Nor is it necessary that the camway, or corresponding member, should be keyed on the shaft 10, but this arrangement is preferred.

A camplate 11 is keyed on the front end of shaft 10 which projects from the body 7. This camplate whose configuration is shown quite diagrammatically in Fig. 9, controls the workpiece support 12 by reciprocating it vertically, its dovetail 13 sliding on the body 7. A threaded spindle 14 is mounted to turn in a bearing 221 in a lug of the work-piece support 12 and equipped with a washer 222 above and a flange 222a below the bearing for holding the spindle 14 against axial displacement in the bearing. The threaded lower end of spindle 14 engages in a threaded sleeve at the upper end of a slide 16 whose lower end bears against the camplate 11. A set screw 15 engages in a slot of the slide 16 for fixing the slide in any desired position on the support 12. By these means, the support 12 is raised and lowered as the camplate 11 rotates with the shaft 10. If the support 12 is arranged for free movement in vertical direction, as shown, its downward movement occurs by the action of gravity in the direction of arrow 49. Obviously, other means, such as extra weights, tension or compression springs acting in the direction of arrow 49, or a piston operated by compressed air or other gas, or by liquid under pressure, might be provided. These other means for controlling the support 12 have not been illustrated but will be understood by any expert without explanation. The weight 18 might be replaced by similar means, not shown. Instead of the camplate 11 on the shaft 10, I might provide stationary cams on the bed plate I at the sides of the carriage II, or any other control, not shown, might be provided instead of camplate 11. Stationary cams on the bed plate I, however, are not as satisfactory as the camplate 11 on the shaft 10. It will be understood that operation of support 12 by such stationary cams is only feasible by shifting the carriage II while the camplate 11 on the shaft 10 reciprocates the support 12 independently of the movement of the carriage.

The front end of the work piece 1 is supported by a point 51 at the front end of the overarm 27, and its rear end is inserted in a spring chuck, or other suitable member, 28. Fig. 10 shows a lever 290 on a shaft 291 for controlling the chuck 28 in the block 50. The straight rear portion of overarm 27 is mounted to slide in a sleeve 223 which is inserted in a hollow boss 224 on the work-piece support 12. Mounted on the rear end of the overarm 27 and held thereon by a shoulder on the arm and a nut 226 on a threaded portion of the overarm, is a piston 225. The piston slides in the bore of the boss 224 and a spring 30 is inserted between it and the sleeve 223. The pressure of the spring 30 forces the point 51 into the front end of the work piece 1. A lever 29 on a shaft 227 in the boss 224 is provided for shifting the overarm 27 against the pressure of spring 30 by a crank 228 to release the work piece 1.

The chuck 28 for the work piece 1 is mounted to rotate in the work-piece support 12. This may be effected by any suitable means and, in the example illustrated, is effected as follows: The chuck 28 is inserted in a bore in the front end of a block 50 which is mounted to rotate in bearings 47 and 48 of the support 12. Any means, such as a lever, not shown, may be connected to the block 50 so as to engage a camway, not shown, on the bed plate I as the body 7 is moved, or to engage a camway, not shown, which, through any suitable means, is operated in dependence of the movement of camway 8 so that the lever is oscillated in dependence of the movement of camway 8 and in turn rotates the chuck 28 through block 50.

The means for rotating and oscillating the block 50 through any desired angle, including 360, which will now be described, is very simple and at the same time permits a great many variations of the movement of block 50. A second camplate 31 is keyed on the shaft 10 in front of camplate 11. 33 is a rack which is mounted to slide in a hollow boss 229 on the work-piece support 12 with its lower end. 38, Fig. 9, is a rod which is secured to, or integral with, the upper end of the rack 33. The rod 38 is mounted to slide in a sleeve 36 which in turn is mounted to slide in a boss 230 of the support 12. The upper end of the sleeve is threaded at 37 and a cap nut 39 which engages in the thread of 37, is mounted to turn on the upper end of the rod 38 but held against axial displacement on the rod by a shoulder on the rod and a check 231 secured to the upper end of the rod. A bracket 232 is secured to the lower end of the sleeve 36 and a lug 32 is attached to the bracket and bears on the camplate 31 under the pull of a spring 35 whose upper end is connected to the bracket while its lower end is anchored on the support 12. A pinion 34 at the rear end of the block 50 meshes with the rack 33.

The rack 33 is reciprocated by the camplate 31 and Fig. 9 shows the rack in its upper final position. While the edge of camplate 31 is parallel to the edge of camplate 11, the rack 33 is stationary and the pinion 34 is neither rotated nor oscillated. As, however, the edge of camplate 31 rises with respect to that of camplate 11 as the shaft 10 rotates, the rack is raised and the pinion 34 is rotated clockwise as viewed in Fig. 9. When the edge of the camplate 31 recedes from the edge of camplate 11, the spring 35 pulls down the rack 33 and the pinion 34 is rotated anti-clockwise.

Obviously, a roller, or any other means, may be provided instead of the lug 32 which is shown as a knife-edge by way of example, and other means than the spring 35 might be provided for moving the rack 33 in downward direction.

Means may be provided for making up for the slack of the rack- and pinion-connection 33, 34 and such means are illustrated by way of example in Fig. 9. A spur gear 44 on a shaft 233, Fig. 10, meshes with the pinion 34 and a pinion 45 on the shaft 233 meshes with a tubular rack 43. The tubular rack is guided in the boss 229 with its lower end and another boss with its upper end. A piston 42 is inserted in the tubular rack at its top, Fig. 9, and a rod 41 extends upwardly from the piston 42 into a spring casing 46 on the support 12. A spring 40 in the casing 46 is inserted between a spring plate 234 at the bottom of casing 46 and another spring plate 235 at the upper end of rod 41. The spring 40, through the medium of rack 43, pinion 45 and spur gear 44, holds the teeth of pinion 34 engaged with the teeth of rack 33. In order to reduce the length of spring 40 and casing 46, the diameter of spur gear 44 is made large as against that of pinion 45, the gear being of the reduction type.

The spring 40 and/or the spring 35 may be replaced by suitable other means, such as weights, pistons under the action of compressed air or other gas, liquid under pressure, etc.

It is to be understood that the showing of camplates 11 and 31 in Fig. 9 is purely diagrammatic, and that I am not limited to the shape of camplates 11 and 31 shown by way of example. Obviously the camplates must be modified as required for each particular operation to be performed on a given work piece 1. The dotted circle 52 in Fig. 9 indicates the area swept by the largest radii of the camplates 11 and 31.

Referring now to Figs. 6 and 14 to 18, the head stock III comprises a body 53 which, as described, is guided by the slide ways 54 in the bed plate I at right angles to the slide ways 9 for the work-piece carriage 7. The camway 55 on the shaft 212 in the bearing 213 against which the roller 84 of the head stock body 53 is held by the springs 56, (which camway may be replaced by a drum or other means, as described for the camway 8 of the work-piece carriage II) serves for shifting the tool 2 with respect to the work piece 1 with the object of adjusting the tool with respect to the work piece, or of generating a given shape in the direction of the depth of the curve. It is also possible to provide extra means such as an additional camway, or any other suitable means for generation in the direction of the depth. The pull-back springs 56 might be replaced by weights or by pistons operated by compressed air of other gas, or by liquid under pressure, as described with reference to the reciprocation of support 12, and with reference to the weight 18.

61 is the principal tool spindle which is tubular and supported in bearings 62 and 63 of the head stock body 53. Mounted to turn in the principal spindle 61 are an outer auxiliary spindle 59 and an inner auxiliary spindle 58. The outer auxiliary spindle 59 is mounted eccentrically in the principal spindle 61, and the inner auxiliary spindle 58 is mounted eccentrically in the outer auxiliary spindle 59. The inner auxiliary spindle 58 receives a chuck 57 for the tool 2. As shown in Fig. 16, the eccentricity of the inner auxiliary spindle 58, related to the outer auxiliary spindle 59, is 60, and the eccentricity of the outer auxiliary spindle 59, related to the principal spindle 61, may be the same eccentricity 60, or another eccentricity 60'. By these means, the tool 2 can be adjusted from eccentricity "0" to twice the eccentricity 60 if the eccentricities are equal, or within the limits of 60—60' to 60+60' if they are not, by so turning the auxiliary spindle 59 with respect to the principal spindle 61 that the eccentricities either add or subtract. Obviously, any intermediate eccentricities may also be obtained in this manner. Figs. 15 and 20 show the limit position in which the eccentricities subtract and the axis of the tool 2 is in the axis of bearings 62 and 63, and Figs. 16 and 21 show the opposite limit position.

A worm 64 is mounted in bearings 65 and 66 on the principal spindle 61 and meshes with a worm wheel 67 on the outer auxiliary spindle 59. By means of a knurled handle 236, the worm 64 is turned for adjusting the eccentricity. The outer end of spindle 59 is graduated and the position of the spindle is read at an index 106.

The shaft 10 of the work-piece carriage II and the spindle 61 of the head stock III are driven by a driving shaft 78, Fig. 14, which may be the shaft of motor 85, Fig. 6, or, as indicated in dot and dash lines in Fig. 14, may be driven from a motor 166 through a worm 167 and a worm gear 168 on the shaft 78. The shaft 78 is mounted in bearings 237 and 238 below the bed plate I and, through gearing 71, 72, a lay shaft 70 in a bearing 239 on the bed plate I and a spur gear 69 meshing with a pinion 68 on the principal spindle 61, rotates this spindle. The inner auxiliary spindle 58 which supports the chuck 57 for the tool 2, is rotated by a spur gear 73 on the lay shaft 70 and a pinion 74. This pinion is mounted on a journal 77 whose axis is parallel to the axis of spindle 58. The solid rear end of spindle 58 is equipped with a dog 75, Figs. 14 and 17, whose sides are arched and preferably cylindrical and engage in a parallel slot 76 of pinion 74 so that the dog is operatively connected to the parallel sides of the slot in any relative position of pinion 74 and spindle 58.

The shaft 212 of camway 55 is rotated from the driving shaft 78 through a worm 80 on the shaft, a worm gear 79 on a lay shaft 81, a worm 82 on the lay shaft, and a worm gear 83 on the shaft 212.

86 is a sheave, sprocket or pulley on the driving shaft 78 and 87 is a cable, belt or chain which connects the member 86 to a corresponding member 88 on the shaft 89, as shown in Fig. 6. The shaft 89, as has been described, is connected to the shaft 10 of the work-piece carriage II by the gearing illustrated in Fig. 7.

It is understood that the drive which has been illustrated, may be modified in various ways. Thus, the work-piece carriage II and the head stock III may each be driven by a separate motor, or they may be driven collectively or individually from a transmission or engine, etc. If equipped with motors of their own, the carriage and the head stock may be placed on any machine as self-contained units, and the machine illustrated in Fig. 6, whose carriage and head stock are operated by the same motor 85, is also a self-contained unit.

A work-piece carriage II which is equipped with a motor 157 of its own, will now be described with reference to Figs. 11 and 12. 158 is a pinion on the shaft of the motor 157 which meshes with a spur gear 159 on a lay shaft 240. A pinion 160 on the lay shaft meshes with a spur gear 161 on the shaft of a worm 162 in mesh with a worm gear 163 on the shaft 10. As mentioned this work-piece carriage is a self-contained unit which may be fitted to any machine.

In this carriage, the camplate 31 for operating the rack 33 is mounted on a journal 114 in the support 12 so that it partakes in the reciprocation of the support, and is connected to the shaft 10 by a joint which may be of the Oldham type and comprises slotted plates 115 and 117, with a slide 116 connecting them, and a slotted plate 119 connected to plate 117 by a slide 118.

The spring 35 for pulling the rack 33 in downward direction, as explained with reference to Figs. 7 to 10, is dispensed with and the rack 43, with a loading of the same, for instance a spring 40 and gearing 44, 45, is relied on for holding the lug 32 against the edge of camplate 31 and for making up for slack. A slide way 165 is provided at one of the side walls of the support 12 in which the bracket 232 engages with a member 164.

Hydraulic means will now be described for regulating the pressure at which the camway 8 and the check correlated to it are pressed against each other, the spindle 14 is held against the camplate 11, and the rack 43 is loaded.

120 is a pump, say, a gear pump, in the carriage 7 which in the example illustrated has three compartments 120a, 120b and 120c, Fig. 12, and may be driven by motor 157. The compartments are connected, respectively, to delivery pipes 121, 122 and 123. The pipes are connected to three cylinders by cap nuts 124, 125, and 126. As the three cylinders are similar, only the lowermost one, 241, will be described with reference to Fig. 13. The cylinder 241 is bored axially and the inner end of the bore is closed by a valve 129. A passage 130 leads from the bore 127 to a pipe 131, and another passage 134 leads into the open air from the seat of valve 129. A hollow plunger 139 is mounted to slide in the cylinder 241 and a spring 128 is inserted between the valve 129 and a seat 142 in the plunger. Two more cylinders, with plungers 140 and 141, are arranged above the cylinder 241 and their passages 130 are connected to pipes 132 and 133, respectively.

The plungers of the three cylinders cooperate with the camway 8 which in this instance is held against axial displacement with respect to the carriage 7 by flanges on the shaft 10 at opposite sides of its bearing 214, and bears against a roller 135 fixed on the bed plate I. The camway 8 is mounted on a disk 149 on the shaft 10 and the disk is equipped with three camtracks 136, 137, and 138 for cooperation, respectively, with the plungers 139, 140, and 141. When one of the plungers is pushed back into its cylinder by the corresponding camtrack, the spring 128 holds the valve 129 down on its seat under a pressure which is determined by the amount to which the spring 128 has been compressed by its plunger, and the pressure in the pipes 131, 132, and 133 rises in proportion. Conversely, if the camtracks allow the plungers to move outwardly in its cylinder, the spring 128 is relieved and the pressure in the pipes 131, 132, 133 is reduced in proportion. By means of the camtracks, the pressure in the pipes is regulated from almost zero to almost the delivery pressure of pump 120.

Pipe 131 connects the cylinder 241 whose plunger 139 is controlled by camtrack 136, to one end of a cylinder 143 in which is mounted a piston 144 whose rod 242 bears against a lug 243 on the carriage 7 and, through shaft 10, holds the camway 8 against the roller 135.

Pipe 132 connects the second cylinder whose plunger 140 is controlled by camtrack 137, to the upper end of a vertical cylinder 145 which is connected to the carriage 7 by an arm 244. A piston 146 is mounted to slide in the cylinder 145 and, through its rod 245 and spindle 14, exerts pressure on the slide 16 which cooperates with camplate 11.

Pipe 133 connects the third or topmost cylinder whose plunger 141 is controlled by camtrack 138, to a cylinder 147 in the support 12, as best seen in Fig. 12. A plunger 148 in this cylinder supports the rack 43 which makes up for the slack between the rack 33 and the pinion 34 on block 50, as described with reference to Figs. 7 to 10.

The camtracks 136, 137 and 138 are so shaped as to produce high pressure in the corresponding pipes 131, 132 and 133 for descending portions of the camway 8 and the camplates 11 and 31, and a low pressure for ascending portions.

A fourth camtrack 151 may be secured to the front face 149 of the disk 150 which effects the adjustment of the tool 2 with respect to the work piece 1 after every complete revolution of shaft 10. The camtrack 151 may cooperate with the piston 152 of a cylinder 153 whose piston rod 246 is held against the camtrack 151 with its outer end by a spring 247 in the cylinder. Liquid under pressure is supplied to the central portion of the cylinder 153 through a pipe 154 which may be connected to a suitable pump or pressure-storage device, not shown. If desired, the pump 120 may also be replaced by such a storage device. The piston 152 admits the liquid from pipe 154 either to a delivery pipe 155 or to a delivery pipe 156. The delivery pipes may be connected to opposite ends of another hydraulic cylinder, not shown, whose piston, if moved in one direction, causes some mechanism, for instance, a pawl- and ratchet-mechanism, to move idly, and, if moved in the opposite direction, causes the mechanism to adjust the tool, as now the pawl operates its ratchet wheel.

In the carriage illustrated in Figs. 11 and 12, the block 50 which supports the work piece 1 in its chuck 28, does not move while portions of the camplate 31 which are concentric to the journal 114, act on the lug 32 of rack 33 but causes the rack to move and to turn the block 50 through pinion 34 when ascending or descending portions of the camplate 31 act on the lug 32.

The camplate 11 may be omitted but thereby the possibilities of generating faces on the work piece are limited. Without the camplate 11, it is possible to tool, for instance, a slot 3—4 as shown in Fig. 2 whose sides are parallel to the radius, and then to tool the slot 5—6, Fig. 4, whose sides are substantially parallel to the radius, but not to insert between the two slots 3—4 and 5—6 a slot such as 4—5 whose sides are not parallel to the radius. Operation of this kind can only be performed if cam 11 is provided for raising and lowering the tool without turning it. Still, the possibilities of generating the curve with any desired gradient, and of keeping uniform the feed of the tool with respect to the work piece, are present without the camplate 11.

A still wider range of possibilities with respect to the surfaces to be tooled is obtained by providing still another camway or camplate, not shown, which displaces, in the direction of the axis of the tool 2, either the carriage II with respect to the tool, or the head stock III with respect to the work piece, independently of the periodic adjustment of the tool. Such a camway or camplate may be fixed on the bed plate I and the carriage II may be caused to bear against the cam with a suitable member under the action of a weight or spring, etc., and to be displaced transversely by its own longitudinal movement. Furthermore, a suitable camway or camplate may be arranged either at the head stock III or at the carriage II, and that part which is without the camway or camplate, may be equipped with a suitable lug and be loaded, so that in this manner the relative displacement of the carriage II and the head stock III is effected. A corresponding camway or camplate may also be arranged at the bed plate of the machine and act on the carriage II or on the head stock III, as desired, and may be moved in dependence of the other movements of the work piece, for instance, by suitable transmission from shaft 10 and, obviously, with a suitable lug and loading means which may always be adapted to the shape of the camway or camplate.

Referring now to Fig. 19, this shows a head stock which is substantially similar to the one described with reference to Figs. 14 to 18 but is designed to be fitted to an existing machine which is partly shown at 90 and may be a lathe or a milling machine. The casing 53 of the head stock is flanged and secured to a split sleeve 91 which is clamped on a fixed part of the machine, for instance, on a cylinder 93, by a screw 92. The sleeve might also be provided with a flange 94, as shown in dot- and dash-lines, which is secured to a surface 95 of the machine. 96 is a rotary shaft of the machine on which a spur gear 97 is secured. The spur gear meshes with another spur gear 98 on a shaft 99. Mounted on the same shaft is a disk 100, with a radial notch 100' having parallel sides. 101 is a pin on the inner auxiliary spindle 58 which is mounted for radial displacement in the notch and the auxiliary spindle 58 is thus operated by the pin 101 in any eccentric position. The principal spindle 61 is rotated in its bearing by a spur gear 102 on shaft 99, a pinion 104 on a shaft 103, and an internal gear 105 on the principal spindle.

The worm 64 is provided as described with reference to Figs. 14 to 18, for adjusting the inner auxiliary spindle 58.

If adapted to a vertical milling machine or a drill press, or other vertical machine, the head stock illustrated in Fig. 19 is placed at right angles to the position illustrated. It is, in fact, adapted to be fitted to any machine.

It will be understood that the means illustrated in Figs. 14 to 22 make up for the wear of the tool 2 or adapt the size of the tool to the configuration of the curve to be generated. The relative movement of the tool 2 and the blank 1 occurs along a cycloid curve, as stated above. The relative oscillation of the two members along the face to be tooled, i. e., the height of the curve (the distance of its zeniths), is very small so that it is possible to tool faces which are spaced apart from the axis of the tool at a greater—and adjustable—distance than the radius of the tool.

This will be understood from Fig. 23. 108 is the projection of a curved surface which is to be generated by the circular tool 2 in a work piece 1. By the means described, the tool 2 which rotates rapidly about its own axis 109, is oscillated for twice the amount of the total eccentricity for which the spindles 59, 61 have been adjusted. The axis 109 of the tool 2 oscillates between the dotted lines 110 and 111, the position of the tool shown in full lines being its inner final position. If the tool 2 had no other movement but its oscillation it would merely move to and fro between the position shown in full lines at 2, and one shown in dot- and dash-lines at 112. However, as the carriage II moves the work piece in the direction of the arrow with respect to the tool 2, the axis of the tool 2 performs a cycloidal movement with respect to the work piece, as indicated by the curve 113. The face 108 is tooled in conformity with this movement. In theory, the generated faces are undulated but in practice the relation of the tool diameter, the feed along the tooled face 108 and the speeds of the principal spindle 61 and the auxiliary spindle 59, can be so determined that any degree of approximation to a continuous curve is obtained.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, and a camming member separate from said first mentioned camming member for rotating said rotary means.

2. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel and transversely to the axis of said rotary means, and a camming member separate from said first mentioned camming member for rotating said rotary means.

3. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, and another camming member shaped in conformity with the operations to be performed on the work piece for rotating said rotary means through any desired angle.

4. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, and a third camming member shaped in conformity with the operations to be performed on the work piece for rotating said rotary means through any desired angle.

5. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece for rotating said rotary means through any desired angle, and a shaft for rotating said camming members.

6. In a machine tool, a work-piece carriage, a work-piece support mounted to slide on said carriage, rotary means in said support for holding a work piece, and mechanism including a camming member on said carriage shaped in conformity with the operations to be performed on the work piece, for imparting relative movement to the rotary means for holding the work piece and to the means for holding the tool, in parallel to the axis of said rotary means, another camming member also on said carriage and also shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece for rotating said rotary means through any desired angle, and arranged on said support, a shaft mounted in said carriage for rotating the first- and second-mentioned camming members, and a universal joint connecting said shaft to the last-mentioned camming member.

7. In a machine tool, rotary means for holding a work piece, means for holding a cutting tool, and mechanism including a camming member shaped in conformity with the operations to be performed on the work piece, for imparting relative movement to the rotary means for holding the work piece and to means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece, a rack controlled by said last-mentioned camming member, and a pinion on said rotary means which meshes with said rack.

8. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece, a rack controlled by said last-mentioned camming member, a pinion on said rotary means which meshes with said rack, and means for returning said rack into its initial position against the action of said last-mentioned camming member.

9. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece, a rack controlled by said last-mentioned camming member, a pinion on said rotary means which meshes with said rack, and means for making up for slack between said rack and said pinion.

10. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece, a rack controlled by said last-mentioned camming member, a pinion on said rotary means which meshes with said rack, and means including another rack operatively connected to said pinion, and means for exerting thrust on said rack; for making up for slack between said rack and said pinion.

11. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece, a rack controlled by said last-mentioned camming member, a pinion on said rotary means which meshes with said rack, and means including another rack, reduction gearing operatively connecting said rack to said pinion, and means for exerting thrust on said rack; for making up for slack between said rack and said pinion.

12. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece for rotating said rotary means through any desired angle, and fluid-controlled means for eliminating slack in the mechanism.

13. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece for rotating said rotary means through any desired angle, a power-transmitting member inserted between any one of said camming members and the part to which this member is operatively connected, and means including a fluid-controlled piston for forcing said power-transmitting member against the corresponding camming member.

14. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece for rotating said rotary means through any desired angle, a power-transmitting member inserted between any one of said camming members and the part to which this member is operatively connected, means including a fluid-controlled piston for forcing said power-transmitting member against the corresponding camming member, and means for regulating the fluid pressure on said piston so that it falls for the ascending, and rises for the descending, portions of the corresponding camming member.

15. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece for rotating said rotary means through any desired angle, a power-transmitting member inserted between any one of said camming members and the part to which this member is operatively connected, means including a fluid-controlled piston for forcing said power-transmitting member against the corresponding camming member, and means including a camtrack on one of said camming members, a plunger controlled by said camtrack, and a throttle valve controlled by said plunger, for regulating the fluid pressure on said piston so that it falls for the ascending, and rises for the descending, portions of the corresponding camming member.

16. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece for rotating said rotary means through any desired angle, a camtrack on one of said camming members, and means operatively connected to said camtrack for adjusting said tool with respect to the work piece.

17. In a machine tool, rotary means for holding a work piece, means for holding a cutting tool, and mechanism including a camming member shaped in conformity with the operations to be performed on the work piece, for imparting relative movement to the rotary means for holding the work piece and to the means for holding the tool, in parallel to the axis of said rotary means, another camming member shaped in conformity with the operations to be performed on the work piece for imparting relative movement to the rotary means for holding the work piece and to the means for holding the tool, transversely to the axis of said rotary means, a third camming member shaped in conformity with the operations to be performed on the work piece for rotating said rotary means through any desired angle, a camtrack arranged for common movement with one of said camming members, and means operatively connected to said camtrack and including a piston for distributing fluid under pressure; for adjusting said tool with respect to the work piece.

18. In a machine tool, means for holding a work piece, a hollow principal spindle, means for rotating said principal spindle, an outer auxiliary spindle mounted eccentrically in said principal spindle, an inner auxiliary spindle mounted eccentrically in said outer auxiliary spindle, a cutting tool on said inner auxiliary spindle, and mechanism including a camming member shaped in conformity with the operations to be performed on the work piece, for imparting relative movement to the means for holding the work piece and to said principal spindle.

19. In a machine tool, means for holding a work piece, a hollow principal spindle, means for rotating said principal spindle, an outer auxiliary spindle mounted eccentrically in said principal spindle, a worm mounted to rotate on said principal spindle, a worm wheel on said outer auxiliary spindle in mesh with said worm, an inner auxiliary spindle mounted eccentrically in said outer auxiliary spindle, a cutting tool on said inner auxiliary spindle, and mechanism including a camming member shaped in conformity with the operations to be performed on the work piece, for imparting relative movement to the means for holding the work piece and to said principal spindle.

20. In a machine tool, means for holding a work piece, a hollow principal spindle, means for rotating said principal spindle, an outer auxiliary spindle mounted eccentrically in said principal spindle, an inner auxiliary spindle mounted eccentrically in said outer auxiliary spindle, means including a dog having arched sides; for driving said inner auxiliary spindle from the means for rotating said principal spindle, a cutting tool on said inner auxiliary spindle, and mechanism including a camming member shaped in conformity with the operations to be performed on the work piece, for imparting relative movement to the means for holding the work piece and to said principal spindle.

21. In a machine tool, means for holding a work piece, a hollow principal spindle, means for rotating said principal spindle, an outer auxiliary spindle mounted eccentrically in said principal spindle, an inner auxiliary spindle mounted eccentrically in said outer auxiliary spindle, means including a radially notched disk and a pin engaging in the notch; for driving said inner auxiliary spindle from the means for rotating said principal spindle, a cutting tool on said inner auxiliary spindle, and mechanism including a camming member shaped in conformity with the operations to be performed on the work piece, for imparting relative movement to the means for holding the work piece and to said principal spindle.

22. In a machine tool in combination, means mounted for rotation about its own axis and adapted to hold a workpiece, means for holding a cutting tool, means for imparting relative movement to the rotary means for holding the workpiece and to the means for holding the tool, a camming member separate from said movement imparting means and shaped in conformity with the operations to be performed by the tool on the workpiece, positive means operatively connecting said camming member to said rotary workpiece-holding means for rotating said rotary means through any desired angle, another camming member, also shaped in conformity with the operations to be performed by the tool on the workpiece, and positive means operatively connecting said other camming member to said rotary work-piece-holding means for shifting said rotary means transversely to its own axis.

23. In a machine tool in combination, means mounted for rotation about its own axis and adapted to hold a workpiece, means for holding a cutting tool, a camming member shaped in conformity with the operations to be performed by the tool on the workpiece, positive means operatively connecting said camming member to said rotary workpiece-holding means for rotating said rotary means through any desired angle, and in any desired direction, another camming member, also shaped in conformity with the operations to be performed by the tool on the workpiece, and positive means operatively connecting said other camming member to said rotary workpiece-holding means for shifting said rotary means transversely to its own axis.

24. In a machine tool in combination, means mounted for rotation about its own axis and adapted to hold a workpiece, means for holding a cutting tool, a camming member shaped in conformity with the operations to be performed by the tool on the workpiece, positive means operatively connecting said camming member to said rotary workpiece-holding means for rotating said rotary means through any desired angle, and another camming member, also shaped in conformity with the operations to be performed by the tool on the workpiece, for shifting said rotary means in parallel to its own axis.

25. In a machine tool in combination, means mounted for rotation about its own axis and adapted to hold a workpiece, means for holding a cutting tool, a camming member shaped in conformity with the operations to be performed by the tool on the workpiece, positive means operatively connecting said camming member to said rotary work-piece holding means for rotating said rotary means through any desired angle at any desired angular velocity for the individual angles, and another camming member, also shaped in conformity with the operations to be performed by the tool on the workpiece, for shifting said rotary means in parallel to its own axis.

26. In a machine tool in combination, means mounted for rotation about its own axis and adapted to hold a workpiece, means for holding a cutting tool, a camming member shaped in conformity with the operations to be performed by the tool on the workpiece, positive means operatively connecting said camming member to said rotary workpiece-holding means for rotating said rotary means through any desired angle, a second camming member, also shaped in conformity with the operations to be performed by the tool on the workpiece, for shifting said rotary means in parallel to its own axis, a third camming member, also shaped in conformity with the operations to be performed by the tool on the workpiece, and positive means operatively connecting said third camming member to said rotary workpiece-holding means for shifting said rotary means transversely to its own axis.

27. In a machine tool in combination, rotary means for holding a workpiece, means for holding a cutting tool, mechanism including a camming member shaped in conformity with the operations to be performed on the workpiece for imparting relative movement to the rotary means for holding the workpiece and to the means for holding the tool, another camming member shaped in conformity with the operations to be performed on the workpiece for rotating said rotary means through any desired angle, and fluid-controlled means for eliminating slack in the mechanism.

28. In a machine tool in combination, rotary means for holding a workpiece, means for holding a cutting tool, mechanism including a camming member shaped in conformity with the operations to be performed on the workpiece for imparting relative movement to the rotary means for holding the workpiece and to the means for holding the tool, another camming member shaped in conformity with the operations to be performed on the workpiece for rotating said rotary means, a power-transmitting member inserted between said second camming member and the part to which this member is operatively connected, and means including a fluid-controlled piston for forcing said power-transmitting member against the second camming member.

29. In a machine tool in combination, rotary means for holding a workpiece, means for holding a cutting tool, mechanism including a camming member shaped in conformity with the operations to be performed on the workpiece for rotating said rotary means, a power-transmitting member inserted between said camming member and the part to which this member is operatively connected, means including a fluid-controlled piston for forcing said power-transmitting member against the camming member, and means for regulating the fluid pressure on said piston so that it falls for the ascending, and rises for the descending, portions of the camming member.

30. In a machine tool in combination, rotary means for holding a workpiece, means for holding a cutting tool, mechanism including a camming member shaped in conformity with the operations to be performed on the workpiece for rotating said rotary means, a power-transmitting member inserted between said camming member and the part to which this member is operatively connected, means including a fluid-controlled piston for forcing said power-transmitting member against the camming member, and means including a camtrack arranged for common movement with said camming member, a plunger controlled by said camtrack and a throttle valve, controlled by said plunger, for regulating the fluid pressure on said piston so that it falls for the ascending, and rises for the descending, portions of the camming member.

31. In a machine tool in combination, rotary means for holding a workpiece, means for holding a cutting tool, mechanism including a camming member shaped in conformity with the operations to be performed on the workpiece for rotating said rotary means through any desired angle, a camtrack arranged for common movement with said camming member and means operatively connected to said camtrack for feeding said tool with respect to the workpiece after each full stroke.

32. In a machine tool in combination, rotary means for holding a workpiece, means for holding a cutting tool, mechanism including a camming member shaped in conformity with the operations to be performed on the workpiece for rotating said rotary means through any desired angle, a camtrack arranged for common movement with said camming member and means operatively connected to said camtrack and including a piston for distributing fluid under pressure for feeding said tool with respect to the workpiece after each full stroke.

33. In a machine tool in combination, rotary means for holding a workpiece, means for holding a cutting tool, means for imparting relative movement to said rotary means for holding the workpiece and to said means for holding the tool and a camming member separate from said movement imparting means especially provided for shifting and rotating the workpiece with respect to the tool for rotating said rotary means, a rack controlled by said camming member, and a pinion provided on said rotary means and adapted to mesh with said rack.

34. In a machine tool in combination, rotary means for holding a workpiece, means for holding a cutting tool, means for imparting relative movement to said rotary means for holding the workpiece and to said means for holding the tool and a camming member separate from said movement imparting means especially provided for shifting and rotating the workpiece with respect to the tool for rotating said rotary means through any desired angle about an axis other than parallel to the axis of said tool-holding means, a rack controlled by said camming member, and a pinion provided on said rotary means and adapted to mesh with said rack.

35. In a machine tool, rotary means for holding a workpiece, means for holding a cutting tool and mechanism including a camming member shaped in conformity with the operations to be performed on the workpiece, a rack controlled by said camming member, a pinion on said rotary means which meshes with said rack, means including another rack operatively connected to said pinion, and means for exerting thrust on said rack for making up for slack between said rack and said pinion.

36. In a machine tool, rotary means for holding a workpiece, means for holding a cutting tool, and mechanism including a camming member shaped in conformity with the operations to be performed on the workpiece, for imparting relative movement to the rotary means for holding the workpiece and to the means for holding the tool, and another camming member shaped in conformity with the operations to be performed on the workpiece, a rack controlled by said last-mentioned camming member, a pinion on said rotary means which meshes with said rack, means including another rack operatively connected to said pinion, and means for exerting thrust on said rack for making up for slack between said rack and said pinion.

37. In a machine tool, rotary means for holding a workpiece, means for holding a cutting tool, and mechanism including a camming member shaped in conformity with the operations to be performed on the workpiece, a rack controlled by said camming member, a pinion on said rotary means which meshes with said rack, means including another rack, reduction gearing operatively connecting said rack to said pinion, and means for exerting thrust on said rack for making up for slack between said rack and said pinion.

38. In a machine tool, rotary means for holding a workpiece, means for holding a cutting tool, and mechanism including a camming member shaped in conformity with the operations to be performed on the workpiece, for imparting relative movement to the rotary means for holding the workpiece and to the means for holding the tool, and another camming member shaped in conformity with the operations to be performed on the workpiece, a rack controlled by said last-mentioned camming member, a pinion on said rotary means which meshes with said rack and means including another rack, reduction gearing operatively connecting said rack to said pinion, and means for exerting thrust on said rack for making up for slack between said rack and said pinion.

FRITZ KOPP.